United States Patent
Suda

(10) Patent No.: US 7,235,147 B2
(45) Date of Patent: Jun. 26, 2007

(54) METHOD OF FORMING TIRE COMPONENT MEMBER

(75) Inventor: Nobuyuki Suda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 70 days.

(21) Appl. No.: 10/343,454

(22) PCT Filed: Jun. 18, 2002

(86) PCT No.: PCT/JP02/06043

§ 371 (c)(1),
(2), (4) Date: Apr. 2, 2003

(87) PCT Pub. No.: WO02/102579

PCT Pub. Date: Dec. 27, 2002

(65) Prior Publication Data

US 2003/0168152 A1    Sep. 11, 2003

(30) Foreign Application Priority Data

Jun. 19, 2001  (JP)  ............................. 2001-184260

(51) Int. Cl.
*B29D 30/30* (2006.01)

(52) U.S. Cl. ...................... 156/117; 156/133; 156/134; 156/264; 156/406.4; 156/906

(58) Field of Classification Search ................ 156/117, 156/133, 134, 123, 406.2, 405.1, 406.4, 264, 156/906, 907
See application file for complete search history.

(56) References Cited

U.S. PATENT DOCUMENTS

| | | | |
|---|---|---|---|
| 2,918,105 A | * | 12/1959 | Harris .......................... 156/361 |
| 2,988,131 A | * | 6/1961 | Frohlich et al. .......... 156/405.1 |
| 3,157,542 A | * | 11/1964 | Trevaskis .................... 156/133 |
| 3,826,297 A | | 7/1974 | Alderfer |

(Continued)

FOREIGN PATENT DOCUMENTS

JP    2001-009928 A    1/2001

OTHER PUBLICATIONS

Derwent abstract for JP 49-76978.*

*Primary Examiner*—Geoffrey L. Knable
(74) *Attorney, Agent, or Firm*—Sughrue Mion, PLLC

(57) ABSTRACT

There is provided a tire structural member forming method capable of forming a structural member of a tire for a vehicle at a low cost, using a simple mechanism satisfactory in space efficiency and capable of setting a band-shaped member of a predetermined length on a forming drum in a high setting accuracy. The tire structural member forming method comprises the steps of applying a band-shaped member (3) of a predetermined length and a predetermined width to a transfer drum (12), moving the transfer drum (12) holding the band-shaped member (3) close to a forming drum (11) of a diameter smaller than that of the transfer drum (12) so that the leading end of the band-shaped member (3) is held between the transfer drum (12) and the forming drum (11), turning the transfer drum (12) and the forming drum (11) in opposite directions, respectively, at the same surface speed to transfer the band-shaped member (3) from the transfer drum (12) to the forming drum (11), and bonding together the leading and the trailing end of the band-shaped member (3) wound around the forming drum (11) to form a tire structural member on the forming drum (11).

6 Claims, 4 Drawing Sheets

U.S. PATENT DOCUMENTS

| | | | |
|---|---|---|---|
| 3,841,941 A * | 10/1974 | Leblond et al. | 156/406 |
| 3,844,871 A | 10/1974 | Habert et al. | |
| 3,852,142 A | 12/1974 | Leblond et al. | |
| 4,025,384 A * | 5/1977 | Shiozaki et al. | 156/502 |
| 4,090,909 A * | 5/1978 | Christie et al. | 156/414 |
| 4,219,601 A * | 8/1980 | Inoue et al. | 428/222 |
| 4,267,104 A * | 5/1981 | Giles et al. | 156/123 |
| 4,504,337 A * | 3/1985 | Askam et al. | 156/64 |
| 4,891,082 A * | 1/1990 | Broyles et al. | 156/123 |
| 5,328,532 A * | 7/1994 | Azuma et al. | 156/134 |
| 6,280,556 B1 * | 8/2001 | Okada et al. | 156/264 |
| 6,616,783 B2 * | 9/2003 | Senbokuya et al. | 156/117 |
| 2003/0051794 A1 * | 3/2003 | Suda et al. | 156/123 |

* cited by examiner

METHOD OF FORMING TIRE COMPONENT MEMBER

TECHNICAL FIELD

The present invention relates to a tire structural member forming method of forming a tire structural member, such as plies or an inner liner, on a forming drum.

BACKGROUND ART

One of three types of tire structural member forming systems shown in FIGS. 5 to 7 is used for forming an annular tire structural member of an automotive tire by winding a band-shaped member of a predetermined length around a forming drum and bonding together the leading and the trailing end of the band-shaped member.

The first tire structural member forming system shown in FIG. 5 carries a band-shaped member 01 by a conveyor belt 03 to feed the band-shaped member 01 to a forming drum 02 disposed close to the delivery end of the conveyor belt 03. The belt-shaped member 01 is wound around the forming drum 02 from its leading edge.

The second tire structural member forming system shown in FIG. 6 places a band-shaped member 01 on a flat plate 05 and moves the flat plate 05 supporting the band-shaped member 01 horizontally to bring the band-shaped member 01 close to a rotating forming drum 02. Then, the band-shaped member 01 is wound from its leading edge around the rotating forming drum 02.

The third tire structural member forming system shown in FIG. 7 carries a band-shaped member 01 of a predetermined length by robot hands 07 and 08. The robot hands 07 and 08 hold the band-shaped member 01 at the leading end and at the trailing end, respectively, by gripping or by suction and carry the band-shaped member 01 to a forming drum 02. The robot hand 07 releases the leading end of the band-shaped member 01 at a position corresponding to the circumference of the forming drum 02. Then, the forming drum 02 is rotated and the other robot hand 08 is moved as the band-shaped member 01 is wound around the forming drum 02.

When the band-shaped member 01 is carried by the first tire structural member forming system using the conveyor belt 03 as shown in FIG. 5, the conveyor belt 03 meanders. Therefore, it is possible that the band-shaped member 01 cannot be correctly located (centered) relative to the forming drum 02. When the band-shaped member 01 of a predetermined length is built by successively superposing and bonding together strips obtained by cutting a long band in the predetermined length on the conveyor belt 03 with their edges trued up, the strips cannot be accurately bonded together because the feed rate of the conveyor belt 03 varies.

When the band-shaped member 01 is carried by the second tire structural member forming system using the flat plate 05 as shown in FIG. 6, the band-shaped member 01 can be set correctly. However, the long flat plate 05 needs to be moved horizontally by a distance nearly equal to its length. Therefore, a large space must be secured for the flat plate 05 to move horizontally and hence the second tire structural member forming system is unsatisfactory in space efficiency.

Although the robot hands 07 and 08 used by the third tire structural member forming system as shown in FIG. 7 are capable of accurately setting the band-shaped member 01 relative to the forming drum 02, the third tire structural member forming system is complicated.

The present invention has been made in view of the foregoing problems and it is therefore an object of the present invention to provide a tire structural member forming method capable of accurately setting a band-shaped member of a predetermined length on a forming drum, of efficiently using space and of forming the tire structural member at a low cost by a simple mechanism.

DISCLOSURE OF THE INVENTION

To achieve the object, according to a first aspect of the present invention, a tire structural member forming method comprises the steps of: applying a band-shaped member of a predetermined length and a predetermined width to a transfer drum; moving the transfer drum carrying the band-shaped member relative and close to a forming drum of a diameter smaller than that of the transfer drum so that the leading end of the band-shaped member is held between the transfer drum and the forming drum; turning the transfer drum and the forming drum in opposite directions, respectively, at the same surface speed to transfer the band-shaped member from the transfer drum to the forming drum; and bonding together the leading and the trailing end of the band-shaped member wound around the forming drum to form a tire structural member on the forming drum.

This tire structural member forming method uses the simple transfer drum instead of the horizontally movable flat plate, the band-shaped member of the predetermined length can accurately be transferred from the transfer drum to the forming drum and can accurately be set on the forming drum, and the tire structural member forming method can be carried out by a low-cost system excellent in space efficiency.

According to a second aspect of the present invention, a tire structural member forming method comprises the steps of: cutting a long band into successive strips of a predetermined width and a predetermined length; forming a band-shaped member of a predetermined length substantially equal to the circumference of a forming drum by applying a predetermined number of the strips to a transfer drum of a diameter greater than that of the forming drum in a circumferential arrangement with side edges of adjacent strips overlapping each other; bringing the transfer drum holding the band-shaped member relative and close to the forming drum to hold the leading end of the band-shaped member between the transfer drum and the forming drum; transferring the band-shaped member from the transfer drum to the forming drum by turning the transfer drum and the forming drum in the opposite directions, respectively, at the same surface speed; and forming a tire structural member on the forming drum by bonding together the leading and the trailing end of the band-shaped member transferred to the forming drum.

Since this tire structural member forming method forms the band-shaped member on the transfer drum by applying the predetermined number of the strips to the transfer drum in a circumferential arrangement with side edges of the adjacent strips overlapping each other, accuracy of bonding the strips can be improved by controlling the angle of rotation of the transfer drum.

Since the band-shaped member can be transferred from the transfer drum to the forming drum and can be set on the forming drum in a high accuracy, a high-quality tire structural member can be formed. This tire structural member forming method can be carried out by a low-cost system excellent in space efficiency.

In each of those tire structural member forming methods, the strips applied to the transfer drum may be held on the transfer drum by suction.

Since the strips are held by suction on the transfer drum, the strips are not dislocated, are able to retain their shapes, and a high bonding accuracy can be insured. The strips can readily be released from the transfer drum by removing the suction to facilitate transferring the strips from the transfer drum to the forming drum, and hence setting accuracy can be improved.

The transfer drum employed in carrying out the foregoing tire structural member forming methods may be finished by a surface treatment such that the band-shaped member applied to the transfer drum can be easily separated from the transfer drum.

Since the transfer drum is finished by the surface treatment to enable the band-shaped member to be separated easily from the transfer drum, setting accuracy can be improved.

In the foregoing tire structural member forming method, the transfer drum may be moved toward and away from the forming drum by swinging or translating the transfer drum.

The transfer drum can simply be swung or translated and hence the system is excellent in space efficiency and can be manufactured at a low cost.

BRIEF DESCRIPTION OF THE DRAWINGS

FIGS. 3-1, 3-2 and 3-3 are views of assistance in explaining successive steps of work for forming plies on the forming drum;

FIGS. 4-1 and 4-2 are views of assistance in explaining steps following the step shown in FIG. 3-3;

BEST MODE FOR CARRYING OUT THE INVENTION

A preferred embodiment of the present invention will be described with reference to FIGS. 1 to 4.

Figure 1:
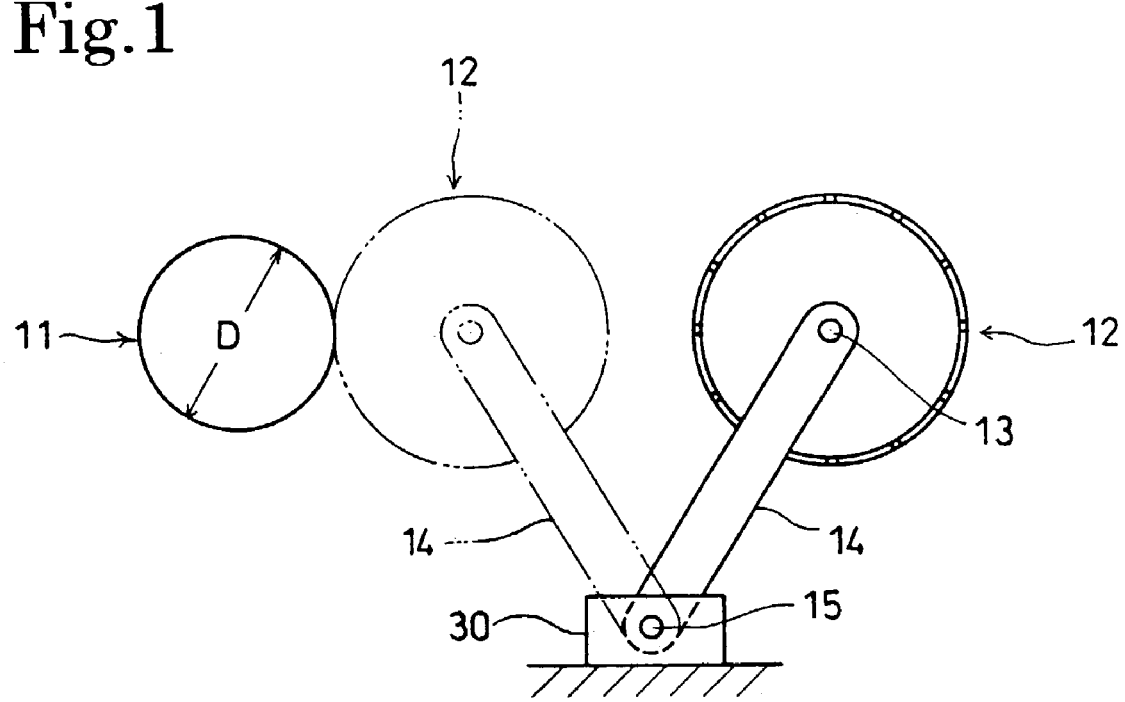
FIG. 1 is a schematic side elevation of a forming drum and a transfer drum.
Figure 2:
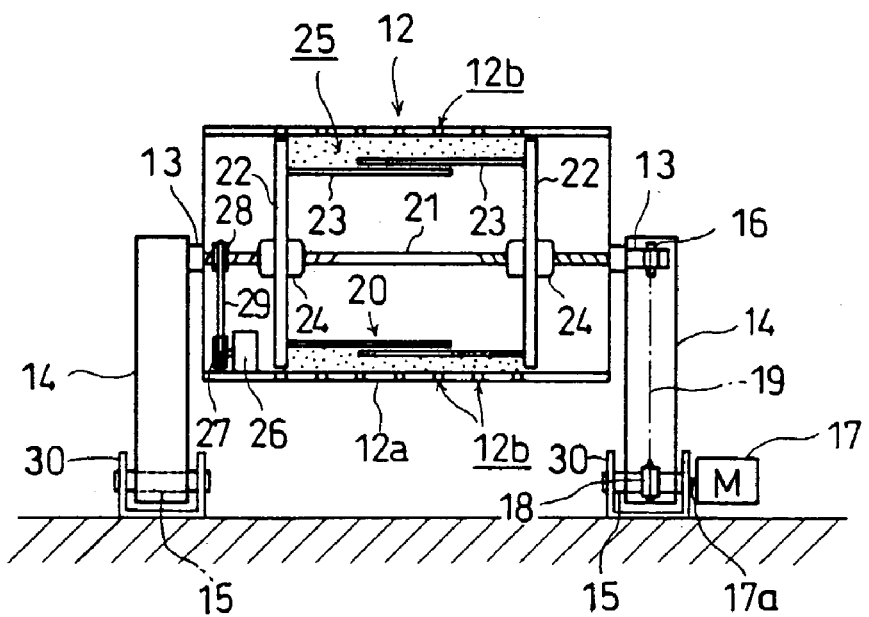
FIG. 2 is a schematic sectional view of the transfer drum, showing internal mechanisms of the transfer drum.

Referring to FIGS. 1 and 2, a forming drum 11 of a diameter D is installed with its center axis extended in a horizontal direction. A transfer drum 12 of a diameter greater than the diameter D is supported for a swinging motion with its center axis extended parallel with that of the forming drum 11.

Support shafts 13 supporting the transfer drum 12 at its opposite ends are supported for rotation on upper end parts of swing arms 14, respectively. Lower base end parts of the swing arms 14 are supported on pivotal shafts 15 which in turn are supported coaxially on fixed support members 30.

The swing arms 14 supporting the transfer drum 12 on its upper end parts turn forward and backward (to the right and the left as viewed in FIG. 1) to move the transfer drum 12 toward and away from the forming drum 11.

A sprocket 16 is mounted on one of the support shafts 13 connected to the transfer drum 12, a sprocket 18 is mounted on the pivotal shaft 15 supporting the lower base end part of one of the swing arms 14, and a chain 19 is extended between the sprocket 16 and 18. The pivotal shaft 15 provided with the sprocket 18 is coupled coaxially with the drive shaft 17a of a motor 17. The motor 17 drives the transfer drum 12 through the chain 19 for rotation on the support shaft 13.

The transfer drum 12 has a cylindrical drum body 12a provided with many through holes 12b. A vacuum mechanism 20 is placed in the cylindrical drum body 12a.

A screw 21 is extended between the support shafts 13 and is supported for rotation. External threads of opposite hands are formed in right and left parts, respectively, of the screw 21. Nuts 24 attached to central parts of partition disk 22 partitioning the interior of the cylindrical drum body 12a are engaged with the external threads of the screw 21.

The partition disks 22 are symmetric with respect to a center plane. Cylindrical members 23 of substantially the same diameter extend from the partition disks 22 toward each other such that an inner end part of one of the cylindrical members 23 is fitted in an inner end part of the other cylindrical member 23.

Thus, the right and the left partition disk 22 and the cylindrical members 23 define an annular vacuum chamber 25 (dotted area in FIG. 2) in the cylindrical drum body 12a. The through holes 12b open into the vacuum chamber 25.

A timing belt 29 is extended between a pulley 27 mounted on the drive shaft of a motor disposed in the cylindrical drum body 12a, and a pulley 28 mounted on the screw 21.

When the motor 26 drives the screw 21 for rotation through the timing belt 29, the partition disks 22 fastened to the nuts 24 engaged with the external threads of the screw 21 are moved axially in opposite directions, respectively, to expand or contract the vacuum chamber 25.

When a pump, not shown, operates to evacuate the vacuum chamber 25 to a vacuum, air is sucked through the through holes 12b into the vacuum chamber 25 to attract strips 2 to the outer surface of the cylindrical drum body 12a by suction.

The position of the partition disks 22 are adjusted such that the axial length of the vacuum chamber 25 corresponds to the length of the strips 2 to attract the strips 2 efficiently to the circumference of the cylindrical drum body 12a.

The strips 2 attracted to the circumference of the cylindrical drum body 12a can be easily separated from the circumference of the cylindrical drum body 12a by supplying low-pressure air into the vacuum chamber 25 to blow air outward through the through holes 12b.

The circumference of the cylindrical drum body 12a is finished by a surface treatment such that the strips can easily be separated from the circumference of the cylindrical drum body 12a.

The transfer drum 12 is thus constructed. Steps of work for forming a ply 4, i.e., a tire structural member, on the forming drum 11 will be described with reference to FIGS. 3 and 4.

Figures 1, 3:
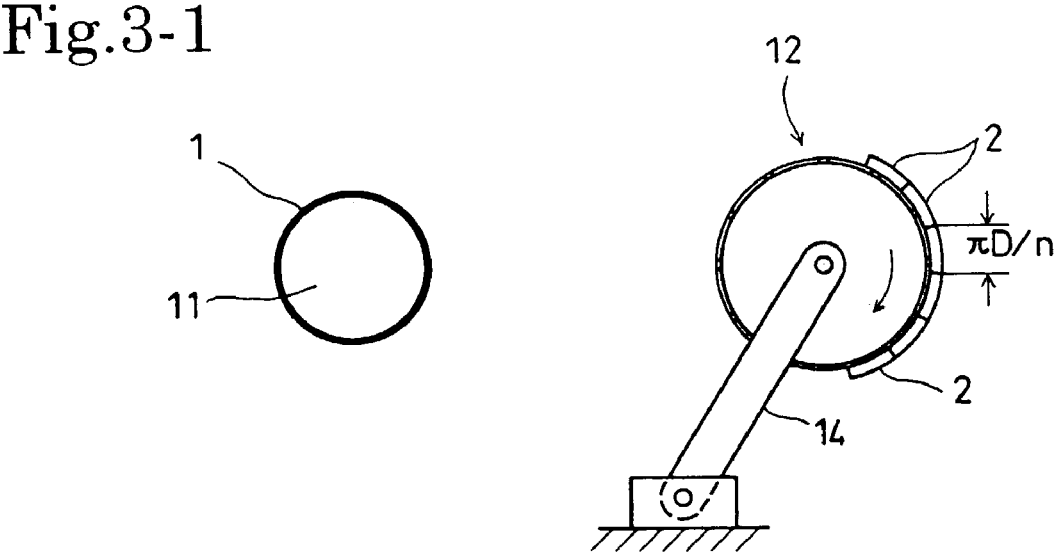
Figures 2, 3:
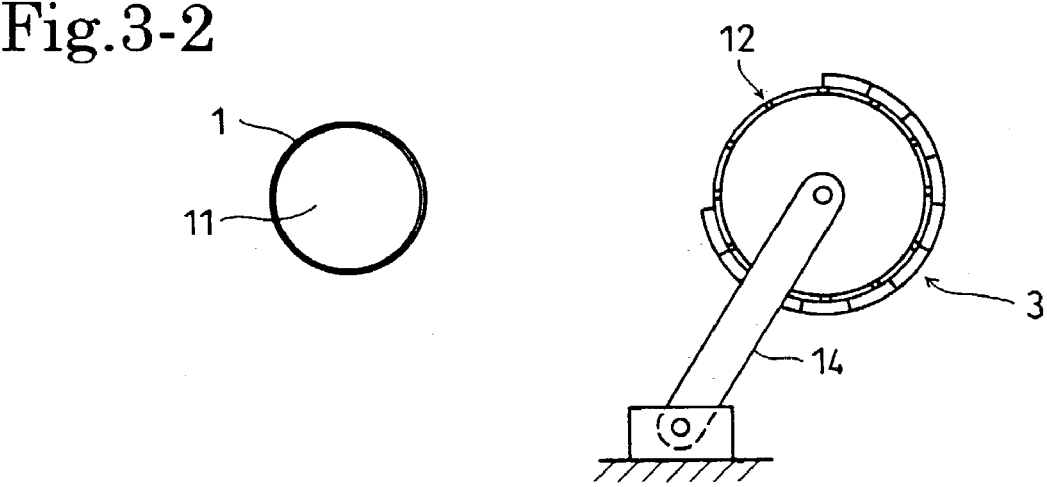
Figure 3:
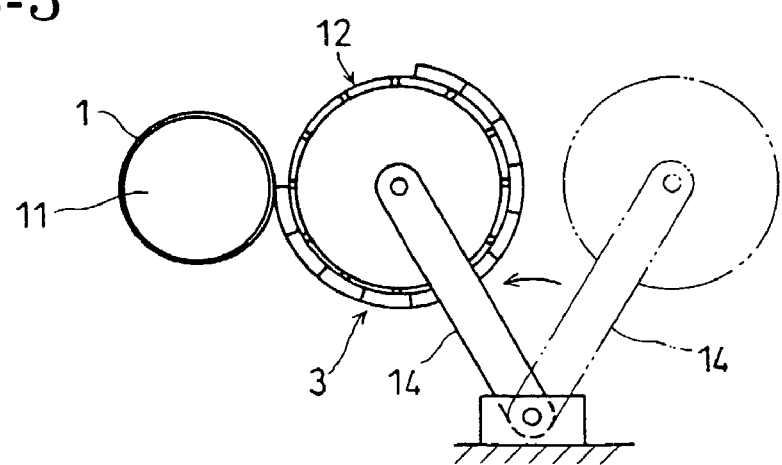

Referring to FIG. 3-1, the transfer drum 12 is set apart from the forming drum 11. An inner liner 1 is wound around the forming drum 11, while the strips 2 of a predetermined length are arranged successively on the circumference of the transfer drum 12 in a circumferential direction with the side edges of the adjacent strips 2 overlapping each other. The strips 2 thus arranged are attracted to the circumference of the transfer drum 12 by suction exerted thereon by the vacuum mechanism 20.

The strips 2 are formed by cutting a long, band of a predetermined width of πD/n (n is an integer) formed by coating a plurality of cords with rubber by an extrusion process in a predetermined length (section width).

The strips 2 are fed successively from a predetermined position onto the intermittently turned transfer drum 12 so that the side edges of the adjacent strips 2 overlap each other.

The distance between the partition disks 22 of the vacuum mechanism 20 is adjusted beforehand to the section width of the strips 2 to form the vacuum chamber 25 properly.

Since the vacuum mechanism 20 attracts the strips 2 to the transfer drum 12 by suction, the strips 2 are not dislocated, are able to retain their shapes, and a high bonding accuracy can be insured.

Thus, the n strips 2 of πD/n in width are applied successively to the transfer drum 12 to form the band-shaped member 3 of a predetermined length substantially equal to the circumference πD of the forming drum 11 and a width equal to the section width is formed on the transfer drum 12 as shown in FIG. 3-2.

Then, the swing arms 14 are turned to move the transfer drum 12 toward the forming drum 11 so that the leading end of the band-shaped member 3 is held between the drums 11 and 12 as shown in FIG. 3-3.

Figures 1, 4:
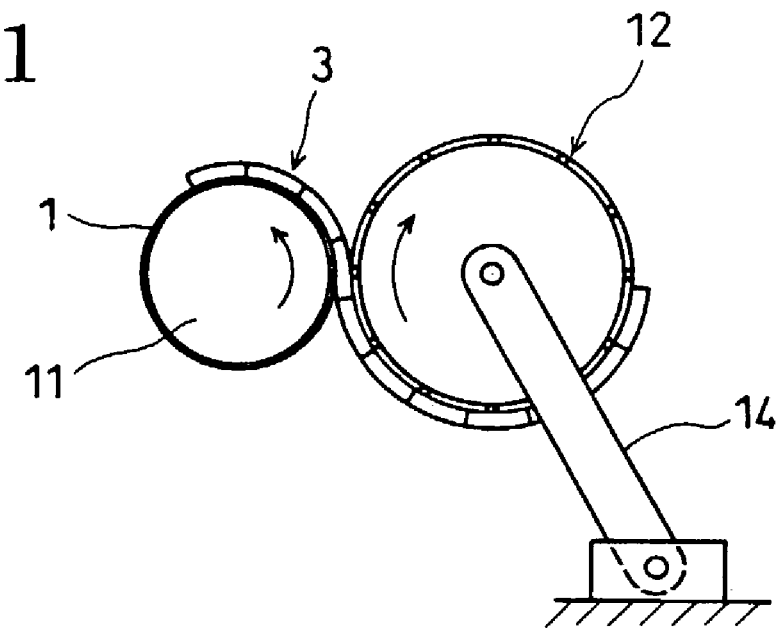
Figures 2, 4:
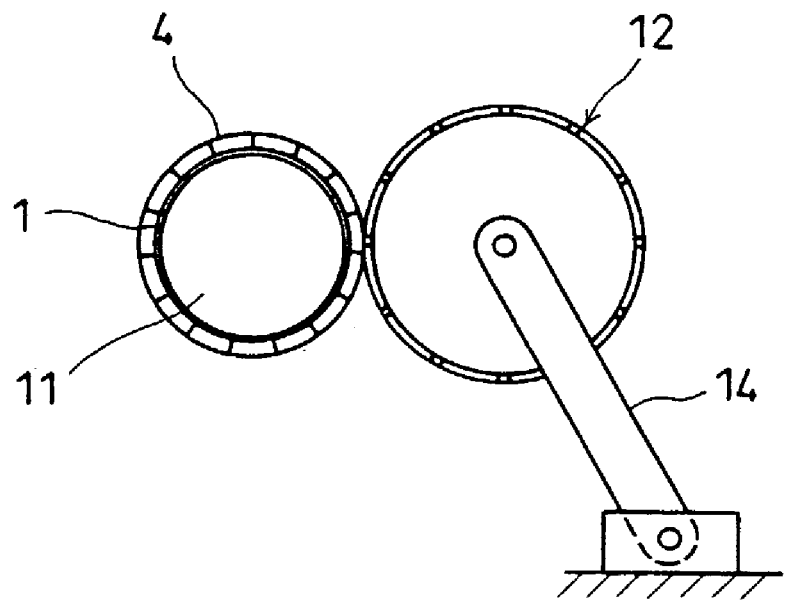
Figure 5:
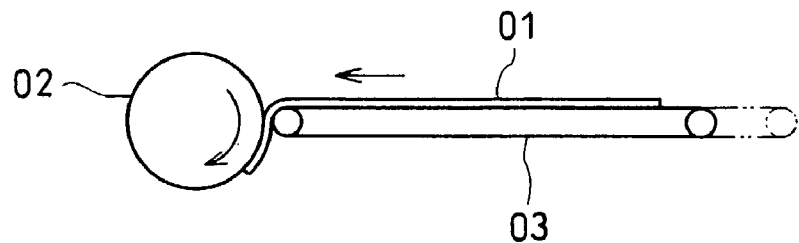
FIG. 5 is a schematic view of a conventional tire structural member forming system for forming a tire structural member on a forming drum.
Figure 6:
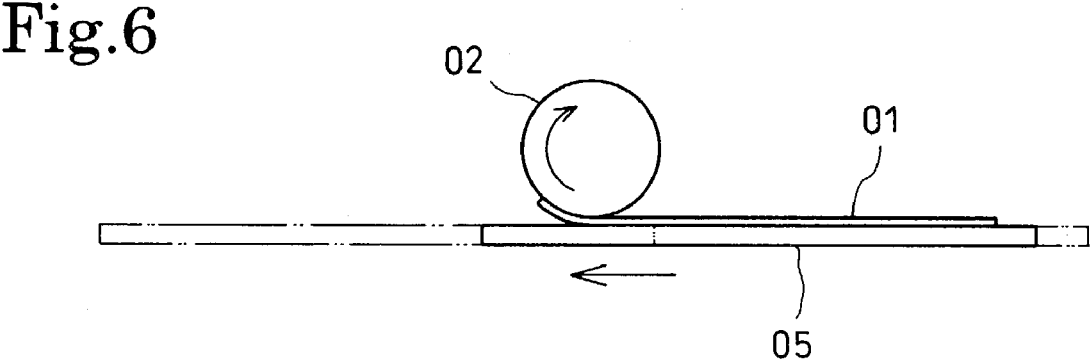
FIG. 6 is a schematic view of another conventional tire structural member forming system for forming a tire structural member on a forming drum.
Figure 7:
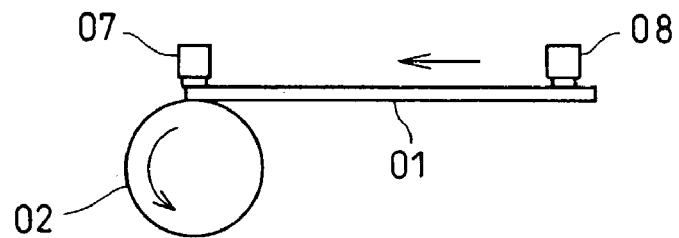
FIG. 7 is a schematic view of a third conventional tire structural member forming system for forming a tire structural member on a forming drum.

Then, the forming drums 11 and the transfer drum 12 are turned in opposite directions, respectively, to transfer the band-shaped member 3 from the transfer drum 12 to the forming drum 11 as shown in FIG. 4-1.

Suction is removed from the strips 2 or air is blown outward at a transfer position to facilitate the separation of the strips 2 from the transfer drum 12. Since the adhesive inner liner 1 is wound around the forming drum 11, the band-shaped member 3 is transferred smoothly.

The band-shaped member 3 can be transferred from the transfer drum 12 to the forming drum 11 and can be set on the forming drum 11 in a very high setting accuracy.

The band-shaped member 3 is wound around the inner liner 1 wound around the forming drum 11 so as to cover the inner liner 1 entirely as shown in FIG. 4-2 because the length of the band-shaped member 3 is substantially equal to the circumference πD of the forming drum 11. The leading and the trailing end of the band-shaped member 3 are bonded together to form the ply 4.

Since the band-shaped member can be transferred from the transfer drum 12 to the forming drum 11 and can be set on the forming drum 11 in a high setting accuracy, the ply 4 has a high quality. The swingable transfer drum 12 having a cylindrical shape is excellent in space efficiency, simple in construction and capable of reducing cost.

The transfer drum may be translated, and the forming drum may be moved toward and away from the transfer drum.

Other tire structural members, such as belts, can be superposed on the inner liner 1 and forming work can be carried out while the transfer drum 12 is separated from the forming drum 11 after the ply 4 has been formed on the forming drum, and then strips 2 are applied again to the transfer drum 12, and hence working efficiency is excellent.

The transfer drum 12 is provided with the vacuum mechanism 20 to hold the ply 4 on the transfer drum 12 by suction in the foregoing embodiment. If the ply includes embedded steel cords, electromagnets may be arranged on the inner circumference of the transfer drum and the ply may be attracted to the transfer drum by magnetism The ply can be easily separated from the transfer drum by stopping the supply of current to the electromagnets.

The transfer drum does not need to be a cylindrical drum; a transfer drum having the shape of a polygonal prism may be used.

The inner liner may be transferred from the transfer drum 12 to the forming drum 11.

The forming drum may be provided with a vacuum mechanism or electromagnets, and the ply and such transferred to the forming drum may be held on the forming drum by suction or magnetism.

The invention claimed is:

1. A tire structural member forming method comprising the steps of:
   providing a forming drum of a diameter on which a tire structural member in the form of a band-shaped member is to be formed, and a transfer drum of a diameter greater than the diameter of the forming drum;
   determining a width of said band-shaped member by dividing the circumference of said forming drum by a predetermined integer;
   cutting a long band having the thus determined width into successive strips of a predetermined length;
   applying a predetermined number equal to said integer of the strips successively in a circumferentially adjoining arrangement onto the transfer drum with side edges of adjacent strips overlapping each other, while the transfer drum is held stationarily at a position and turned intermittently at that position, to thus obtain the band-shaped member having a predetermined length which is substantially equal to the circumfrence of the forming drum;
   moving the transfer drum holding the band-shaped member away from said position to another position close to the forming drum to hold a leading end of the band-shaped member between the transfer drum and the forming drum;
   transferring the band-shaped member from the transfer drum to the forming drum by turning the transfer drum and the forming drum in opposite directions, respectively, at the same surface speed, whereby the leading end and a trailing end of the band-shaped member are brought into abutting contact with each other; and
   forming a tire structural member on the forming drum by bonding together the leading end and the trailing end of the band-shaped member transferred to the forming drum.

2. The tire structural member forming method according to claim 1, wherein the band-shaped member is applied to and held on the transfer drum by suction from within the transfer drum.

3. The tire structural member forming method according to claim 1, wherein the transfer drum is finished by a surface treatment such that the band-shaped member applied to the transfer drum can be easily separated from the transfer drum.

4. The tire structural member forming method according to claim 1, wherein the transfer drum is moved toward and away from the forming drum by swinging or translation.

5. The tire structural member forming method according to claim 1, further comprising:
   urging the band-shaped member that is being transferred from the transfer drum to the forming drum, away from the transfer drum, to thereby press the band-shaped member against the forming drum.

6. The tire structural member forming method according to claim 1, wherein the strips are applied to and held on the transfer drum by suction from within the transfer drum, and the band-shaped member is urged away from the transfer drum by switching from the suction to outward air blowing from within the transfer drum.

* * * * *